(12) United States Patent
Lin

(10) Patent No.: US 6,671,001 B2
(45) Date of Patent: Dec. 30, 2003

(54) OFFSET LEVEL DETECTION METHOD FOR AUTO COLOR GAIN CONTROL OF ANALOG VIDEO SIGNALS

(75) Inventor: Chia-Yang Lin, Taoyuan Hsien (TW)

(73) Assignee: Mitac International Corp., Hsinchu (TW)

( * ) Notice: Subject to any disclaimer, the term of this patent is extended or adjusted under 35 U.S.C. 154(b) by 438 days.

(21) Appl. No.: 09/791,631

(22) Filed: Feb. 26, 2001

(65) Prior Publication Data

US 2002/0118305 A1 Aug. 29, 2002

(51) Int. Cl.[7] ............................. H04N 5/52; H04N 9/73
(52) U.S. Cl. ..................... 348/679; 348/678; 348/655; 348/603; 348/255
(58) Field of Search ........................... 348/679, 677, 348/692, 678, 675, 655, 649, 650, 647, 617, 603, 255, 256, 223.1; 382/162, 167; 358/520, 518, 516; 345/690, 88

(56) References Cited

U.S. PATENT DOCUMENTS

| | | | | |
|---|---|---|---|---|
| 4,594,609 A | * | 6/1986 | Romao et al. | .............. 380/218 |
| 4,631,589 A | * | 12/1986 | Hongu et al. | ............... 348/696 |
| 5,757,440 A | * | 5/1998 | Mangelsdorf | ............ 340/573.4 |
| 6,429,905 B1 | * | 8/2002 | Yamamoto | ................... 348/656 |
| 6,480,240 B1 | * | 11/2002 | Tamura et al. | .............. 348/659 |
| 6,507,667 B1 | * | 1/2003 | Hsieh et al. | ................ 382/167 |
| 6,535,245 B1 | * | 3/2003 | Yamamoto | ............... 348/223.1 |
| 6,542,202 B2 | * | 4/2003 | Takeda et al. | .............. 348/678 |
| 6,552,751 B1 | * | 4/2003 | Shigeta | ........................ 348/659 |

* cited by examiner

*Primary Examiner*—John Miller
*Assistant Examiner*—Jean W. Désir
(74) *Attorney, Agent, or Firm*—Rabin & Berdo, P.C.

(57) ABSTRACT

An offset level detection method for auto color gain control of analog video signals, which is used to find an optimal offset level for determining the input of the auto color gain control. The method includes at least the following steps: First, a lower limit of the min of analog video signals is determined. The position of the lower limit of the min is set as a first min. An upper limit of the min is searched backwards from the first min. The position of the upper limit of the min is set as a second min. Finally, the first min and the second min are averaged to obtain an optimal offset level.

6 Claims, 3 Drawing Sheets

OFFSET LEVEL DETECTION METHOD FOR AUTO COLOR GAIN CONTROL OF ANALOG VIDEO SIGNALS

BACKGROUND OF THE INVENTION

1. Field of Invention

The invention relates to an offset level detection method and, in particular, to an offset level detection method applied in auto color gain control of analog video signals.

2. Related Art

When analog video signals are in auto color gain control, the offset level is determined by a Min of input signals. The input signals often receive interference so that the Min of the signals is usually determined to be lower than the actual value when searching the signal Min. Eventually, the black signal output to an LCD is slightly larger than the actual black signal, which makes it impossible to achieve a white balance.

Usually, when performing auto color gain control, it is crucial to find a max and a min of analog input signals, corresponding to FFh and OOh of digital output signals. In ideal situations, entering a signal of 0V corresponds to the outputting the value 00h. Due to difference in analog video card manufacturing and the noise interference and amplitude attenuation of signals when passing through transmission lines, different video cards have slightly different output voltages after going through transmission lines.

When searching for the min of input signals, the minimum of the input signals is often taken as the offset level. When noises are small, the result is satisfactory. However, when noises become bigger, the offset level is affected by noises and becomes smaller. This might make the digital output corresponding to the analog 0V input signal (black) greater than 00h (such as 05h or 07h, depending upon the noises). As a result, when showing on a digital display, the black signal does not give the real black. Therefore, finding an exact mapping relation has become an important issue.

SUMMARY OF THE INVENTION

The offset level detection method for auto color gain control of analog video signals disclosed herein finds an optimal offset level for determining the input of the auto color gain control.

The disclosed method follows a searching method to look for a lower limit of the min of input signals and set the lower limit as a first min. An upper limit of the min is searched backwards from the first min and the upper limit is set as a second min. Finally, the first min and the second min are averaged to obtain an optimal offset level.

Using this method, an optimal offset level of the min (black) and max (white) of analog video signals can be found. It does not only lowers the interference of noises but can also achieve the white balance effect in video signal displays.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
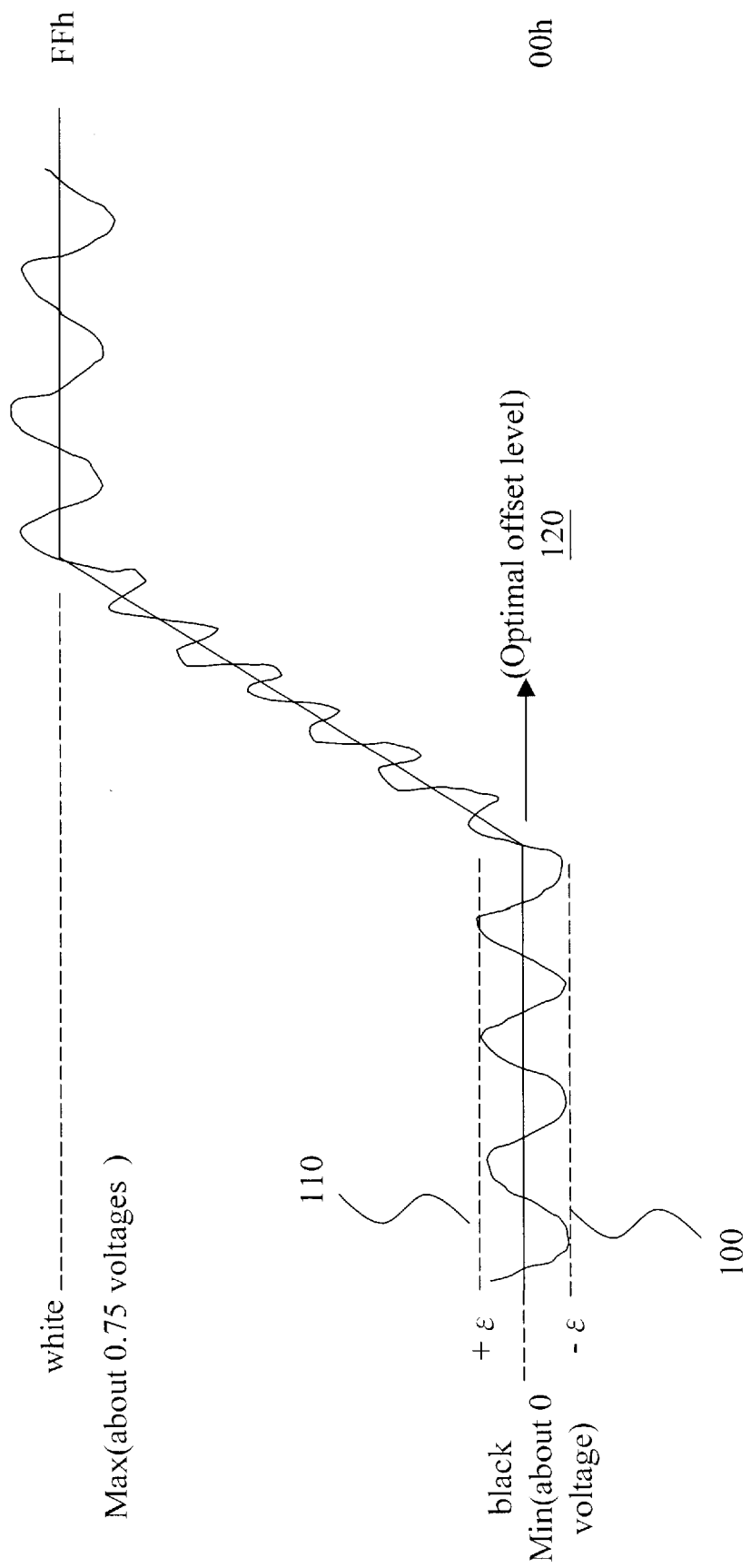
FIG. 1 is a schematic view of noise interferences in analog input video signals.

With reference to FIG. 1, the analog video signals are red (R), green (G) and blue (B) signals. The disclosed method uses a searching method to find a first min 100 and a second min 110 and averages the first min 100 and the second min 110 to obtain an optimal offset level 120, which is used to determine the input for auto color gain control.

Figure 2:
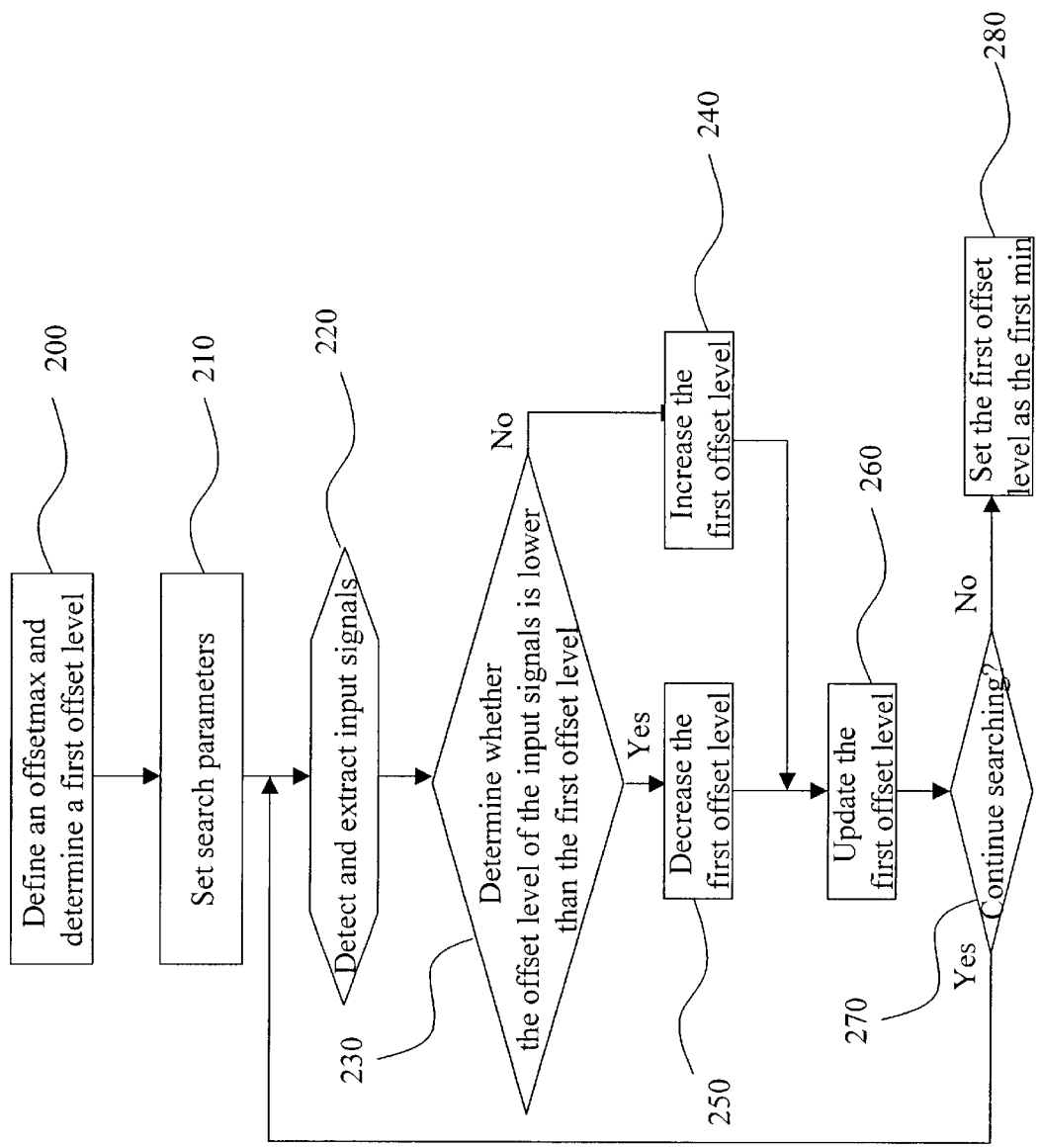
FIG. 2 is a searching method flowchart for determining the first min according to the disclosed method.

Referring to FIG. 2, in accordance with the searching method used to determine the first min in the invention, an offsetmax is defined and a first offset level is determined (step 200). The first offset level is set to be a half of the offsetmax. The next step is to set search parameters (step 210) to determine the searching loops for the first min. After defining and setting relevant parameters, input signals are detected and extracted (step 220). The method further determines whether the offset level of the input signals is lower than the first offset level (step 230). If the offset level of the input signals is higher than the first offset level, the first offset level is then gradually increased (step 240); otherwise, the first offset level is decreased steadily (step 250). After each increase or decrease, the first offset level is updated (step 260). The increase or decrease amount is determined by the system. The system then determines whether it should continue the search according to the search parameters (step 270). After finishing the search, the system sets the first offset level as the first min (step 280). The first min is thus found. That is, the first min is where the offset level reaches the minimum (=0)–$\epsilon$, as shown in FIG. 1.

Figure 3:
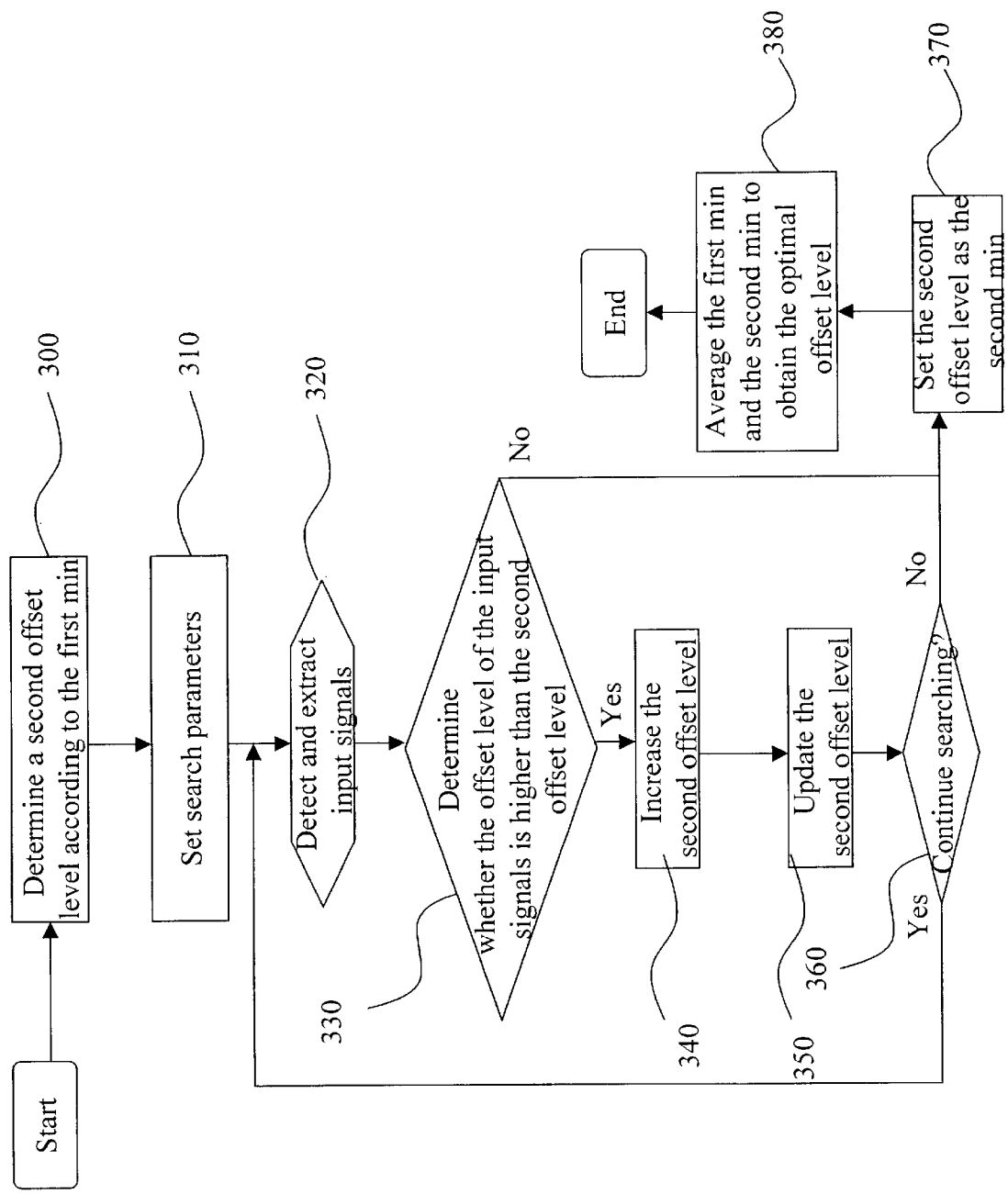
FIG. 3 is a searching method flowchart for determining the second min and the optimal offset level according to the disclosed method.

The searching method for determining the second mm and the optimal offset level is shown in FIG. 3. First, a second offset level is determined according to the first min (step 300.) At the moment, the second offset level is set to be equal to the first min and search parameters are set (step 310) to determine the searching loops for the second min. Input signals are then detected and extracted (step 320). The method further determines whether the offset level of the input signals is higher than the second offset level (step 330). If the offset level of the input signals is higher than the second offset level, the second offset level is then gradually increased (step 340) and the second offset level is updated (step 350); otherwise, step 370 is performed. The system then determines whether it should continue the search according to the search parameters (step 360). After finishing the search, the system sets the second offset level as the second min (step 370). The second min is thus found. That is, the second min is where the offset level reaches the minimum (=0) +$\epsilon$, as shown in FIG. 1. Finally, the first min and the second min are averaged to obtain the optimal offset level (step 380), which is then used to determine the input for auto color gain control.

From the above description, the min (black) of analog video signals can be accurately found. In an analogous way, applying the above search algorithm, a max (white) of analog video signals can be accurately found. The max refers to white signals with inputs between 0.5V and 1V. Therefore, this part is not further addressed herein. The video display can achieve the expected white balance effect.

Certain variations would be apparent to those skilled in the art, which variations are considered within the spirit and scope of the claimed invention.

What is claimed is:

1. An offset level detection method for auto color gain control of analog video signals for finding an optimal offset level to determine inputs for the auto color gain control, which comprises the steps of:

defining an offsetmax of the analog video signals and determining a first offset level and search parameters;

detecting and extracting the analog video signals;

increasing the first offset level when the offset level of the video signals is higher than the first offset level;

decreasing the first offset level when the offset level of the video signals is lower than the first offset level;

updating the first offset level until the search is complete;

setting the first offset level as a first min;

determining a second offset level and search parameters according to the first min;

detecting and extracting the analog video signals;

determining whether the offset level of the video signals is higher than the second offset level;

increasing the second offset level when the offset level of the video signals is higher than the second offset level;

updating the second offset level until the search is complete;

setting the second offset level as a second min; and averaging the first min and the second min to obtain the optimal offset level.

2. The detection method of claim 1, wherein the analog video signals are red (R), green (G) and blue (B) primitive color signals.

3. The detection method of claim 1, wherein the step of determining the first offset level is to set the first offset level as a half of the offset max.

4. The detection method of claim 1, wherein the optimal offset level can be applied to the min and max of the analog video signals.

5. The detection method of claim 4, wherein the min refers to a black signal with 0V input.

6. The detection method of claim 4, wherein the max refers to a white signal with input between 0.5V and 1V.

* * * * *